United States Patent
Mudusuru

(10) Patent No.: US 7,210,033 B1
(45) Date of Patent: Apr. 24, 2007

(54) METHOD, SYSTEM, AND COMPUTER-READABLE MEDIUM FOR ENABLING MULTI-SEGMENTED RECOVERY OF BASIC INPUT OUTPUT SYSTEM PROGRAM CODE IN A COMPUTER SYSTEM

(75) Inventor: Giri P. Mudusuru, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 343 days.

(21) Appl. No.: 10/966,778

(22) Filed: Oct. 15, 2004

(51) Int. Cl.
*G06F 9/00* (2006.01)
*G06F 15/177* (2006.01)

(52) U.S. Cl. ............... 713/2; 717/168; 717/169; 717/170; 717/171; 717/172; 717/173; 717/174; 717/175; 717/176; 717/177; 717/178

(58) Field of Classification Search ........... 713/1–2; 717/168–178
See application file for complete search history.

(56) References Cited

U.S. PATENT DOCUMENTS

| | | | | |
|---|---|---|---|---|
| 5,548,751 A | * | 8/1996 | Ryu et al. ............ | 707/102 |
| 5,835,761 A | * | 11/1998 | Ishii et al. ............ | 713/100 |
| 5,900,883 A | * | 5/1999 | Crucs ................... | 345/629 |
| 6,141,698 A | * | 10/2000 | Krishnan et al. ..... | 719/331 |
| 6,308,265 B1 | * | 10/2001 | Miller .................. | 713/2 |
| 6,405,316 B1 | * | 6/2002 | Krishnan et al. ..... | 713/190 |
| 6,633,964 B2 | * | 10/2003 | Zimmer et al. ...... | 711/163 |
| 6,711,675 B1 | * | 3/2004 | Spiegel et al. ........ | 713/2 |
| 7,069,431 B2 | * | 6/2006 | Dayan et al. ......... | 713/2 |
| 2003/0018870 A1 | * | 1/2003 | Abboud et al. ....... | 711/173 |
| 2004/0044886 A1 | * | 3/2004 | Ng et al. .............. | 713/1 |
| 2004/0076043 A1 | * | 4/2004 | Boals et al. .......... | 365/200 |
| 2004/0193865 A1 | * | 9/2004 | Nguyen et al. ....... | 713/2 |

* cited by examiner

*Primary Examiner*—Rehana Perveen
*Assistant Examiner*—James F. Sugent
(74) *Attorney, Agent, or Firm*—Hope Baldauff Hartman, LLC

(57) ABSTRACT

A method, system, and computer-readable medium for enabling the segmented recovery of Basic Input Output System ("BIOS") program code in a computer system is provided. A system is provided that includes a recovery program for recovering BIOS code in the computer system. The recovery program retrieves split program files, each containing a portion of BIOS code, from storage media, such as floppy diskettes, and combines the program files into a single BIOS image file utilized by the computer system to recover the BIOS.

20 Claims, 4 Drawing Sheets

METHOD, SYSTEM, AND COMPUTER-READABLE MEDIUM FOR ENABLING MULTI-SEGMENTED RECOVERY OF BASIC INPUT OUTPUT SYSTEM PROGRAM CODE IN A COMPUTER SYSTEM

TECHNICAL FIELD

The present invention is related to computer system configuration. More particularly, the present invention is related to the recovery of Basic Input Output System ("BIOS") program code in a computer system.

BACKGROUND OF THE INVENTION

Some computer systems have a firmware BIOS containing basic routines which are accessed to boot the computer as well as to initialize and interface hardware with operating system software. In many modern computer systems, the BIOS code is stored as groups of memory "blocks" in a re-programmable memory device typically known as a "flash" part. A flash part is a type of non-volatile random access memory ("NVRAM") allowing existing BIOS code to be easily updated or replaced by using software to erase and program the flash part. Many flash parts include a hardware protected memory block of a fixed size called a "boot block" which cannot be erased when the hardware protection is engaged. The boot block in a flash part may store program code for starting a computer system as well as self-contained program code for recovering the BIOS to the flash part from a user-supplied BIOS "image file" which, for older computer systems, is typically stored on a floppy disk. The image file contains a copy of the BIOS code which is accessed by the boot block recovery code in the event the BIOS code in the flash part becomes corrupted or is unintentionally erased.

In recent years the size of the typical BIOS code stored in the flash parts of modern computer systems has increased beyond the storage capacity of a conventional floppy disk in order to support added features such as language modules (for providing foreign language support) and graphic images which may be displayed to a user during the computer startup sequence. This increase in the size of the BIOS code has resulted in a corresponding increase in the size of the image file needed to recover the BIOS, which is also beyond the capacity of a floppy disk. As a result, modern BIOS images are limited to larger media for storage. Furthermore, as support for new features is added to computer systems, the size of the BIOS code will continue to increase, thus further limiting the availability of media for storing BIOS image files needed for recovery.

It is with respect to these considerations and others that the present invention has been made.

SUMMARY OF THE INVENTION

In accordance with the present invention, the above and other problems are solved by a method, system, and computer-readable medium for enabling the segmented recovery of BIOS program code in a computer system. Utilizing the various aspects of the invention, BIOS program code may be split into a number of smaller files each containing a portion of the BIOS code. The code contained in the files may then be retrieved by a BIOS recovery program and combined to assemble a BIOS image file utilized by the computer system to recover the BIOS.

According to one aspect of the invention, a computer system is provided for enabling the multi-segmented recovery of BIOS program code. The system includes memory for storing executable recovery program code for recovering BIOS program code in the computer system, storage media for storing program files comprising the BIOS code, and a processor, in communication with the memory and the storage media. The storage media may be floppy disks each storing a portion of the BIOS code.

The recovery program retrieves a first program file from the storage media and compares it to the size of a current BIOS image in the computer system. In response to determining that the first program file is smaller than the current BIOS image, the recovery program searches for and retrieves subsequent files from the storage media until the combined size of the retrieved program files is equal to the size of the BIOS image. In retrieving the program files from the storage media, the recovery program copies the program files ahead of a starting location in the memory reserved for storing the BIOS image. The recovery program then initiates recovery of the BIOS code utilizing the combined BIOS code copied into the memory. The recovery program may also request a program file not found on the storage media from a user.

Illustrative embodiments of the invention may also be implemented as a computer process or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
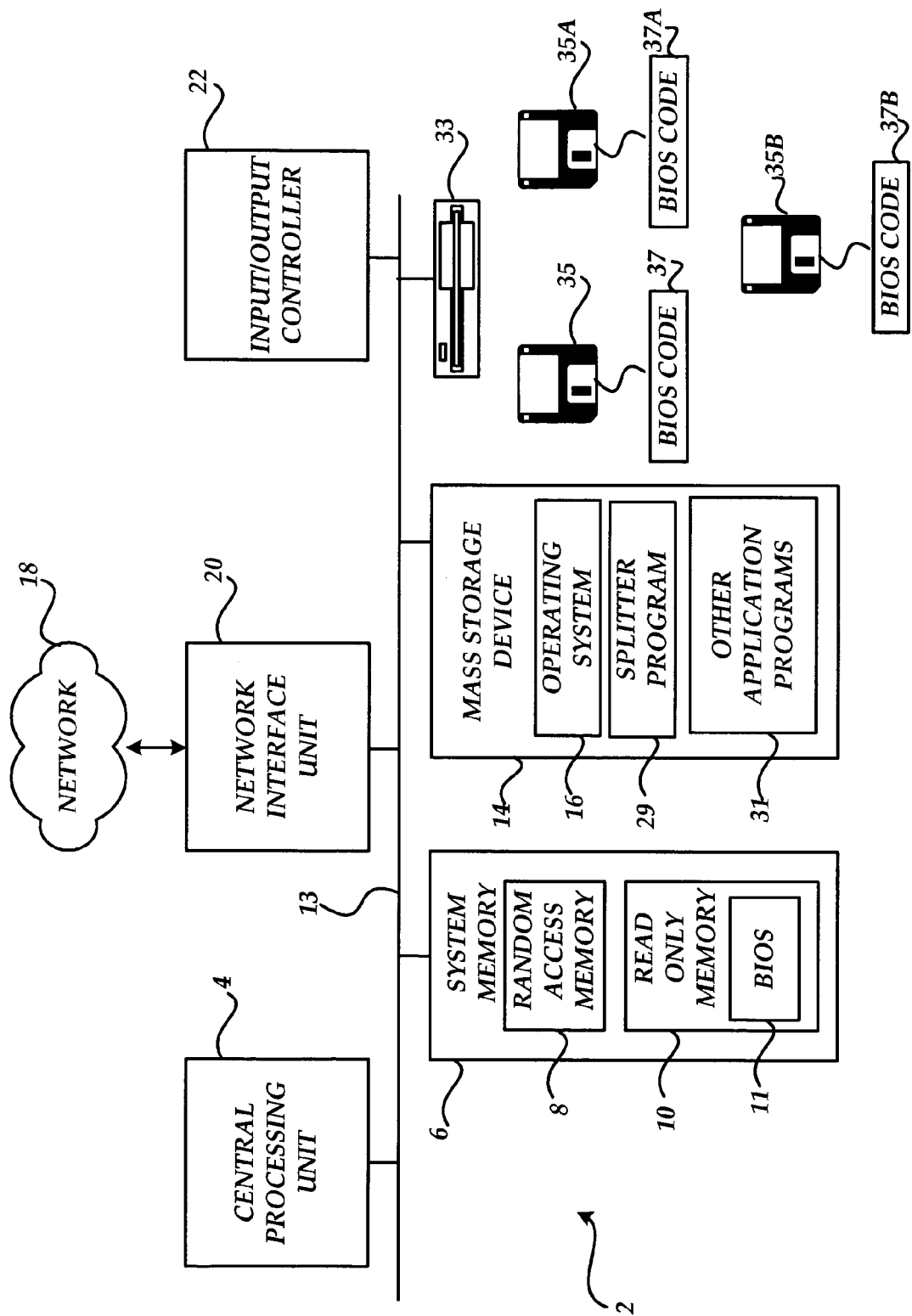
FIG. 1 illustrates a computer architecture utilized in illustrative embodiments of the invention.

Embodiments of the present invention provide methods for enabling multi-segmented recovery of BIOS program code in a computer system. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer system 2 which was discussed briefly above, for practicing the various embodiments of the invention will be described. The computer system 2 comprises a standard local or server computer operative to execute one or more application programs. The computer system 2 includes a central processing unit 4 ("CPU"), a system memory 6, including a RAM 8 and a read-only memory ("ROM") 10 and a system bus 13 that couples the system memory 6 to the CPU 4.

The ROM 10 may comprise a NVRAM for storing BIOS code containing the basic routines that help to transfer information between elements within the computer. Those skilled in the art will understand that NVRAM devices may also be known as "flash parts." The basic routines contained in the BIOS are accessed to boot the computer as well as to initialize and interface hardware with operating system software. One such routine is the power-on self-test ("POST") routine. The POST routine is executed after the computer system is turned on for performing diagnostics and initializing system components in the computer system.

It will be understood by those skilled in the art that the BIOS "also contains routines for starting the computer system 2 as well as self-contained program code for recovering the BIOS" to the ROM 10 from a user-supplied "image file" which may contain a copy of the BIOS code. As will be discussed in greater detail below, the BIOS code in the image file may be "split" over a plurality of computer storage media, such as floppy disks 35, 35A, and 35B. The aforementioned routines and recovery code are stored in a hardware-protected area of the ROM 10 called a "boot block." The contents of the ROM 10 and the boot block will be described in greater detail below with respect to FIG. 2.

The computer system 2 further includes a mass storage device 14, such as a hard drive, for providing non-volatile storage for the computer system 2. The mass storage device 14 stores an operating system 16, a splitter program 29, and other application programs 31. The splitter program 29 may comprise a program which enables program code and/or data from large files to be "spanned" over multiple storage media such as floppy disks. For example, in various illustrative embodiments of the invention, the splitter program 29 may be utilized to split an image file containing a copy of the BIOS code for the computer system 2 into BIOS code files 37, 37A, and 37B. The mass storage device 14 is connected to the CPU 4 through a mass storage controller (not shown) connected to the system bus 13.

The computer system 2 further includes a media storage device such as disk drive 33, for providing non-volatile storage of program files and/or data for the computer system 2 on removable computer-readable media such as the floppy disks 35, 35A, and 35B. As known to those skilled in the art, the disk drive 33 may be connected to the CPU 4 through its own storage controller (not shown) which is connected to the system bus 13. It should be understood that the media storage device is not limited to the disk drive 33 as shown in FIG. 1, but may also include optical storage devices such as CD-ROM and DVD drives, magnetic storage devices such as magnetic tape drives, or other media storage devices known to those skilled in the art.

It should be appreciated by those skilled in the art that the computer-readable media discussed above can be any available media that can be accessed by the computer system 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage, or any other medium which can be used to store the desired information and which can be accessed by the computer system 2.

The computer system 2 may operate in a networked environment using logical connections to remote computers through the network 18. The computer system 2 may connect to the network 18 through a network interface unit 20 connected to the bus 13. It should be appreciated that the network interface unit 20 may also be utilized to connect to other types of networks and remote computer systems. The computer system 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device.

Figure 2:
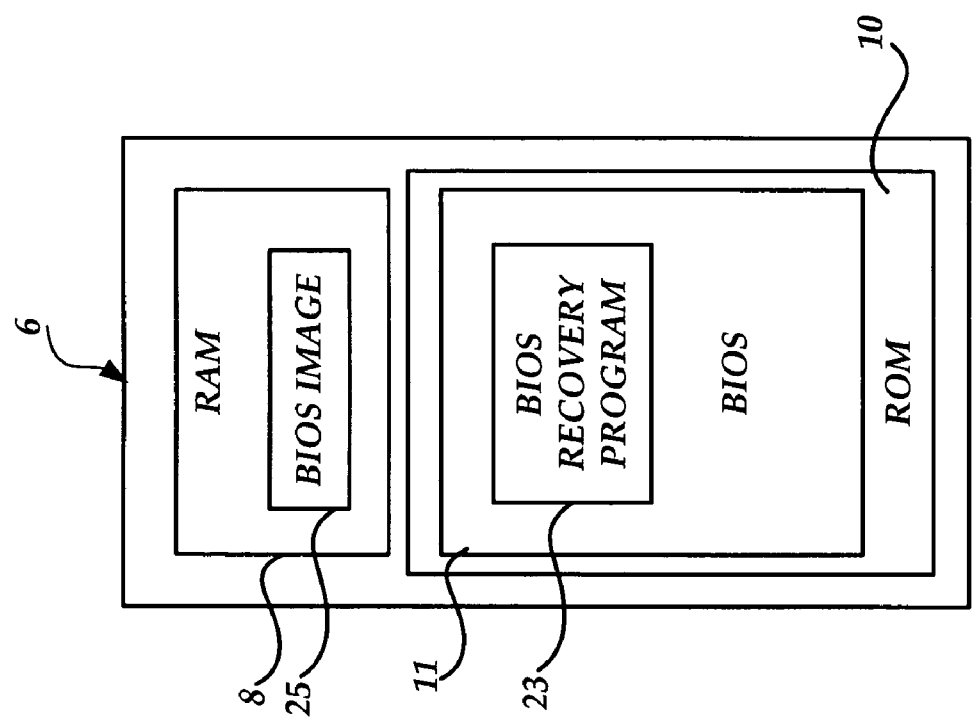
FIG. 2 is a block diagram of the system memory in the computer system of FIG. 1, according to an illustrative embodiment of the invention.

Turning now to FIG. 2, a block diagram of the system memory 6 of the computer system 2 is shown containing the BIOS recovery code stored in the boot block as discussed above in FIG. 1. As discussed above, the BIOS code 11 for the computer system is stored in the ROM 10 and includes BIOS recovery program 23 which is a routine programmed into the hardware protected boot block for recovering the BIOS 11 in the event that the BIOS 11 becomes corrupted or is unintentionally erased. It will be appreciated by those skilled in the art that the computer system 2 may be configured to copy the BIOS 11 into a reserved memory area in the RAM 8 (known as "shadow RAM") when the computer boots to increase the speed of execution of the BIOS code. The copy of the BIOS code in the shadow RAM area is known as a BIOS image. The BIOS recovery program 23, according to various illustrative embodiments of the invention, may be configured to combine the portions of a split BIOS image file into a single BIOS image prior to recovering the BIOS. The operations of the recovery program 23 will be discussed in greater detail in the description of FIGS. 3–4, below.

Figure 3:
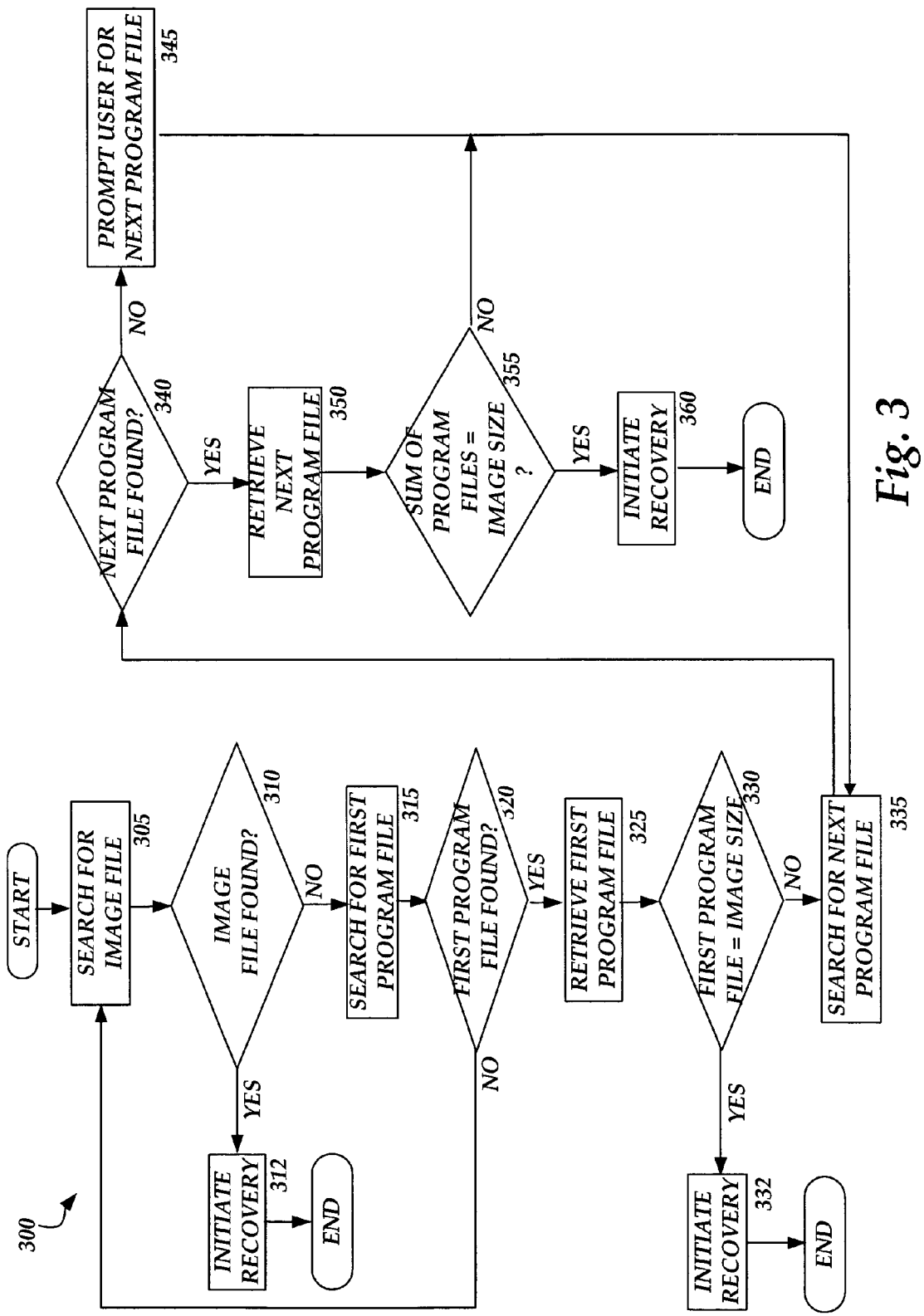
FIG. 3 is a flowchart showing illustrative logical operations for enabling the segmented recovery of BIOS program code in the computer system of FIG. 1, according to various illustrative embodiments of the invention.

Referring now to FIG. 3, an illustrative routine 300 will be described illustrating a process for enabling multi-segmented recovery of BIOS program code in a computer system. It should be appreciated that although the embodiments of the invention described herein are presented in the context of floppy disk media, the invention may be utilized with any type of removable storage media which is readable by a computer system.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring now to FIG. 3, an illustrative routine 300 will be described for recovering the BIOS code in the computer system 2 utilizing the BIOS recovery program 23 and the floppy disks 35, 35A, and 35B. It will be appreciated that the operations of the routine 300 may be initiated when the BIOS 11 stored in the ROM 10 becomes corrupted or is unintentionally erased resulting in the execution of the recovery program 23 in the protected boot block stored in the ROM 10. The recovery program 23 may be executed by a user by entering a pre-assigned key combination such as CTRL-C, for example. The routine 300 begins at operation 305, where, upon execution of the recovery program 23, the recovery program 23 searches for an image file from which to recover the BIOS. In particular, the recovery program 23 may be configured to access the floppy disk drive 33 and search media contained therein for the name of an image file (e.g., "AMIBOOT.ROM") containing a complete copy of the BIOS code. The routine 300 then branches from operation 305 to operation 310.

If, at operation 310, the image file is found, then the routine 300 branches from operation 310 to operation 312. At operation 312, the recovery program 23 initiates recovery of the BIOS code by copying it to the ROM 10. The routine 300 then ends. If, at operation 310, the image file is not found, then the routine 300 branches from operation 310 to operation 315.

At operation 315, the recovery program 23 searches for a first program file (i.e., a split file). In particular, the recovery program 23 may be configured to modify the search file name to the name of a program file (e.g., "AMIBOOT.001") which may contain a portion or all of the BIOS code. The routine 300 then branches from operation 315 to operation 320. If, at operation 320, the program file is not found, then the routine 300 returns to operation 305 where the recovery program 23 modifies the search file name and searches for the name of the image file. If, at operation 320, the first program file is found, then the routine 300 branches from operation 320 to operation 325.

At operation 325, the recovery program 23 retrieves the first program file into the RAM 8. In particular, the recovery program 23 determines a starting memory location in the RAM 8 for which to copy the first program file. In the presently described illustrative embodiment, the starting memory location may be a memory location following the shadow RAM area used to store the BIOS image when the computer system 2 is booted. For instance, if the shadow RAM area occupies the first 2 megabytes of the RAM 8, then the starting memory location for the first program file would be at 2 megabytes. A block diagram showing how the recovery program 23 may utilize various memory locations in the RAM 8 for storing program files will be discussed in greater detail in the description of FIG. 4, below. The routine 300 then branches from operation 325 to operation 330.

At operation 330, the recovery program 23 determines if the size of the retrieved first program is equivalent to the size of the BIOS image. In particular, the recovery program 23 in the boot block may be pre-configured with the size of the BIOS image for the computer system 2 (e.g., in megabytes) and may compare this data to the size of the retrieved first program file. If, at operation 330, the recovery program 23 determines that the size of the first program file is equivalent to the size of the BIOS image, then the routine 300 branches from operation 330 to operation 332 where the recovery program 23 initiates recovery of the BIOS as discussed above with respect to operation 312. The routine 300 then ends. If, at operation 330, the recovery program 23 determines that the size of the first program file is less than the size of the BIOS image, then the routine 300 branches from operation 330 to operation 335.

At operation 335, the recovery program 23 searches for a next program file containing a portion of the BIOS code for the computer system 2. In particular, the recovery program 23 may, after retrieving the first program file, be configured to modify the search file name by incrementing a file extension of the first program file. For instance, if the name of the first program file is "AMIBOOT.001", then the recovery program 23 will search for the name "AMIBOOT.002" to retrieve the next program file. The routine 300 then branches from operation 335 to operation 340 where the recovery program 23 determines if the next program file is found.

If, at operation 340, the next program file is not found, then the routine 300 branches from operation 340 to operation 345 where the recovery program 23 prompts a user for the requested file. For instance, if the recovery program 23 is searching for the file name "AMIBOOT.002" and finds "AMIBOOT.001" it may be configured to issue an audible prompt and display a message to the user to insert a floppy disk containing the file "AMIBOOT.002" in the floppy disk drive 33. The routine then returns from operation 345 to operation 335 where the recovery program 23 again searches for the next program file.

If, at operation 340, the next program file is found, then the routine 300 branches from operation 340 to operation 350. At operation 350, the recovery program 23 retrieves the next program file into the RAM 8 at a memory location ahead of the starting memory location where the first program file was copied. In particular, the recovery program 23 may be configured to add the starting memory location to the size of the previously retrieved first program file to determine the starting memory location at which to copy the next program file. For instance, if the starting memory location is at 2 megabytes and the first program file is 1 megabyte in size, then the memory location for the next program file would be at 3 megabytes. It will be appreciated by those skilled in the art that the recovery program 23 may utilize registers in the CPU 4 for determining the memory locations in the RAM 8 for copying the program files containing BIOS code. In particular, the CPU 4 may store the starting memory location in a first register and the size of the first program file in a second register. The CPU 4 then sums the two numbers in the registers and places the result in a third register. The recovery program 23 may then retrieve the result from the register and copy the next program file at the computed memory location in the RAM 8. The routine 300 then branches from operation 350 to operation 355.

At operation 355, the recovery program 23 determines if the sum of the sizes of the first program file and the next program file is equivalent to the size of the BIOS image. As discussed above with respect to operation 350, the registers in the CPU 4 may be utilized by the recovery program 23 in making these computations. If, at operation 355, the recovery program 23 determines that the size of the first program file is equivalent to the size of the BIOS image, then the routine 300 branches from operation 355 to operation 360 where the recovery program 23 initiates recovery of the BIOS as discussed above with respect to operation 312. The routine 300 then ends. If, at operation 330, the recovery program 23 determines that the size of the first program file is less than the size of the BIOS image, then the routine 300 returns from operation 355 to operation 335 where the recovery program 23 searches for a next program file. It should be understood that for subsequent program files, memory locations may be determined by adding the starting memory location to the size of all previously retrieved program files. For instance, if the starting memory location is at 2 megabytes and the first program file is 1 megabyte in size and the second program file is 2 megabytes in size, then the memory location for the third or next program file would be at 4 megabytes. As discussed above with respect to operation 350, the registers in the CPU 4 may be utilized by the recovery program 23 in making these computations.

Figure 4:
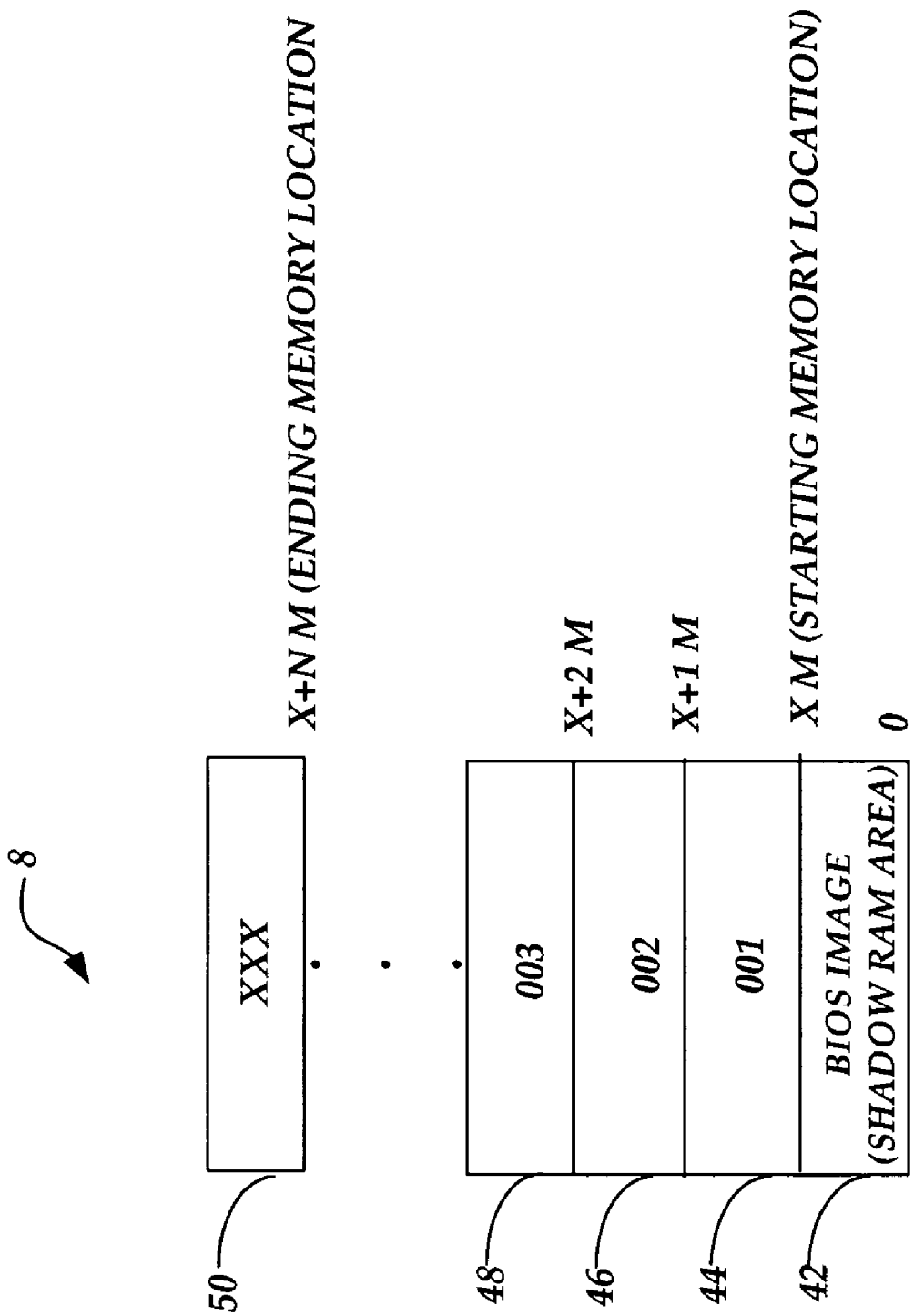
FIG. 4 is a block diagram of memory locations in the Random Access Memory ("RAM") of the computer system of FIG. 1, according to an illustrative embodiment of the invention.

Turning now to FIG. 4, a block diagram of memory locations in the RAM 8 utilized by the recovery program 23 for storing program files will now be described. As shown in FIG. 4, the RAM 8 includes memory locations 42–50. The memory location 42 includes memory in the RAM 8 from 0 to X megabytes (the starting memory location). The memory location 44 includes memory in the RAM 8 from X megabytes to X+1 megabytes. The memory location 46 includes memory in the RAM 8 from X+1 megabytes to X+2 megabytes. The memory location 48 includes memory in the RAM 8 from X+2 megabytes to X+3 megabytes. Finally, the memory location 50 (the ending memory location) includes memory in the RAM 8 from X+3 megabytes to X+N megabytes. As discussed above with respect to FIG. 2, the memory location 42 (the shadow RAM area) may be utilized to store the BIOS image from the ROM 10. The remaining memory locations 44–50 may be utilized by the recovery program 23 to store the program files needed to recover the BIOS code. For instance, the memory location 44 may be utilized to store the first program file, the memory location 46 may be utilized to store the second program file, etc.

Based on the foregoing, it should be appreciated that the various embodiments of the invention include a method, system, and computer-readable medium for enabling multi-segmented recovery of BIOS program code in a computer system. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for enabling multi-segmented recovery of Basic Input Output System (BIOS) program code in a computer system, the method comprising:
   (a) retrieving a program file comprising BIOS code for the computer system as a current program file;
   (b) comparing the size of the current program file to the size of a current BIOS image in the computer system;
   (c) if the size of the current program file is smaller than the size of the current BIOS image, then retrieving a next program file;
   (d) increasing the size of the current program file to include the size of the next program file;
   (e) repeating the operations (b)–(d) until the size of the current program file is equivalent to the size of the current BIOS image in the computer system; and
   (f) initiating recovery of the BIOS code from the current program file.

2. The method of claim 1, wherein retrieving a program file comprising BIOS code for the computer system as a current program file comprises:
   searching for the program file on a storage medium; and
   if the program file is found on the storage medium, then:
       determining a starting memory location; and
       copying the program file from the storage medium to the starting memory location.

3. The method of claim 2, wherein if the program file is not found on the storage medium, then:
   modifying the name of the program file and searching for a new program file bearing the modified name on the storage medium.

4. The method of claim 2, wherein retrieving a next program file comprises:
   searching for the next program file on the storage medium;
   if the next program file is found on the storage medium, then:
       determining a starting memory location; and
       copying the next program file from the storage medium to a memory location ahead of the starting memory location.

5. The method of claim 4, wherein if the next program file is not found on the storage medium, then requesting the next program file from a user.

6. The method of claim 1, wherein increasing the size of the current program file to include the size of the next program file comprises combining the BIOS code in the current program file with the BIOS code in the next program file.

7. The method of claim 1, wherein the program file and the next program file are split program files, wherein each split program file comprises a portion of the BIOS code for the computer system.

8. The method of claim 2, wherein the storage medium comprises a floppy disk readable by a floppy disk drive.

9. A computer system for enabling multi-segmented recovery of Basic Input Output System (BIOS) program code in a computer system, comprising:
   a memory for storing executable program code for recovering BIOS program code in the computer system;
   storage media for storing program files comprising the BIOS code; and
   a processor, in communication with the memory and the storage media, the processor being responsive to computer-executable instructions contained in the program code and operative to:

retrieve a first program file comprising BIOS code for the computer system from the storage medium as a current program file;

(a) compare the size of the current program file to the size of a current BIOS image in the computer system;

(b) if the size of the current program file is not equivalent to the current BIOS image, then retrieve a next program file from the storage media;

(c) increase the size of the current program file to include the size of the next program file;

repeat the operations (a)–(c) until the size of the current program file is equivalent to the current BIOS image in the computer system; and initiate recovery of the BIOS code from the current program file.

10. The computer system of claim 9, wherein in retrieving a program file comprising BIOS code for the computer system as a current program file the processor is further operative to:

search for the program file on the storage media; and if the program file is found on the storage media, then:
determine a starting location in the memory; and
copy the program file from the storage media to the starting memory location.

11. The computer system of claim 10, wherein if the program file is not found on the storage media, the processor is operative to:

modify the name of the program file and search for a new program file bearing the modified name on the storage media.

12. The computer system of claim 10, wherein the processor in retrieving a next program file is further operative to:

search for the next program file on the storage media; and if the next program file is found on the storage media, then:
determine a starting memory location; and
copy the program file from the storage media to a memory location ahead of the starting memory location.

13. The computer system of claim 12, wherein if the next program file is not found on the storage media, then the processor is further operative to request the next program file from a user.

14. The computer system of claim 9, wherein the processor in increasing the size of the current program file to include the size of the next program file is further operative to combine the BIOS code in the current program file with the BIOS code in the next program file.

15. The computer system of claim 9, wherein the program file and the next program file are split program files, wherein each split program file comprises a portion of the BIOS code.

16. The computer system of claim 9, wherein the storage media comprises a floppy disk readable by a floppy disk drive.

17. A computer-readable storage medium having computer-executable instructions which when executed on a computer perform a method for enabling multi-segmented recovery of Basic Input Output System (BIOS) program code, the method comprising:

retrieving a program file comprising BIOS code as a current program file;

(a) comparing the size of the current program file to the size of a current BIOS image;

(b) if the size of the current program file is smaller than the size of the BIOS image, then retrieving a next program file;

(c) increasing the size of the current program file to include the size of the next program file;

repeating the operations (a)–(c) until the size of the current program file is equivalent to the size of the BIOS image; and initiating recovery of the BIOS code from the current program file.

18. The computer-readable storage medium of claim 17, wherein retrieving a program file comprising BIOS code as a current program file comprises:

searching for the program file on a storage medium; and if the program file is found on the storage medium, then:
determining a starting memory location; and
copying the program file from the storage medium to the starting memory location.

19. The computer-readable storage medium of claim 18, wherein retrieving a next program file comprises:

searching for the next program file on the storage medium;

if the next program file is found on the storage medium, then:
determining a starting memory location; and
copying the program file from the storage medium to a memory location ahead of the starting memory location.

20. The computer-readable storage medium of claim 17, wherein increasing the size of the current program file to include the size of the next program file comprises adding the program code in the current program file to the program code in the next program file.

* * * * *